US012227004B2

(12) United States Patent
Muto

(10) Patent No.: US 12,227,004 B2
(45) Date of Patent: Feb. 18, 2025

(54) LIQUID DISCHARGE DEVICE

(71) Applicant: SEIKO EPSON CORPORATION, Tokyo (JP)

(72) Inventor: Kota Muto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 205 days.

(21) Appl. No.: 18/191,054

(22) Filed: Mar. 28, 2023

(65) Prior Publication Data

US 2023/0302789 A1 Sep. 28, 2023

(51) Int. Cl.
*B41J 2/045* (2006.01)

(52) U.S. Cl.
CPC ......... *B41J 2/0455* (2013.01); *B41J 2/04586* (2013.01)

(58) Field of Classification Search
CPC .................. B41J 2/0455; B41J 2/04586; B41J 2002/17579; B41J 29/38; B41J 2/17566
See application file for complete search history.

(56) References Cited

U.S. PATENT DOCUMENTS 11,772,383 B2 * 10/2023 Shinkawa ............ B41J 2/17566 347/7
2022/0134766 A1 5/2022 Shinkawa

FOREIGN PATENT DOCUMENTS

JP 2010-187092 A 8/2010
JP 2014-112786 A 6/2014
JP 2022-73293 A 5/2022

* cited by examiner

*Primary Examiner* — Thinh H Nguyen
(74) *Attorney, Agent, or Firm* — Rankin, Hill & Clark LLP

(57) ABSTRACT

A liquid discharge device includes a discharge section that discharges a liquid, a storage section, a transmission electrode provided at a first surface, a reception electrode provided at a second surface, a drive circuit that drives the transmission electrode, and a detection circuit that receives a reception signal from the reception electrode. The storage section is configured to store the liquid between the first surface and the second surface. The detection circuit includes a peak detection circuit that detects a peak value of the reception signal, a discharge switch provided at an output of the peak detection circuit, and a detection signal output circuit. The detection signal output circuit outputs a detection signal for detecting a residual quantity of the liquid stored in the storage section based on the output of the peak detection circuit. The discharge switch is switched from on to off before a detection operation of the detection circuit.

18 Claims, 9 Drawing Sheets

FIG. 9

| | | | |
|---|---|---|---|
| EXAMPLE 1 | PRINTING | PREDETERMINED NUMBER OF SHEETS | |
| EXAMPLE 2 | | PREDETERMINED NUMBER OF SHEETS ACCORDING TO PRINT MODE | |
| EXAMPLE 3 | NOZZLE CLEANING | | |
| EXAMPLE 4 | INK INJECTION | OFF-CARRIAGE SYSTEM | LID OPENING OR LID CLOSING |
| EXAMPLE 5 | | ON-CARRIAGE SYSTEM | CARRIAGE IS AT INK INJECTION POSITION |

LIQUID DISCHARGE DEVICE

The present application is based on, and claims priority from JP Application Serial Number 2022-051176, filed on Mar. 28, 2022, the disclosure of which is hereby incorporated by reference herein in its entirety.

BACKGROUND

1. Technical Field

The present disclosure relates to a liquid discharge device and the like.

2. Related Art

JP-A-2010-187092 discloses a peak detector. The peak detector includes a peak detection circuit and a sample-and-hold circuit that samples and holds an output voltage of the peak detection circuit. The peak detection circuit includes a reset switch and a capacitor charged with a peak value of an input voltage via a diode. When the reset switch is turned on by a reset pulse, the capacitor is discharged, and the output voltage of the peak detection circuit becomes zero.

In JP-A-2010-187092, it is assumed that the peak detector is used for oil film detection. JP-A-2010-187092 discloses that an output voltage of the sample-and-hold circuit is always equal to the peak value of the input voltage between reset pulses. However, it is not disclosed at what timing the reset pulse is generated. In particular, JP-A-2010-187092 neither discloses nor suggests control in detecting a liquid level.

SUMMARY

An aspect of the present disclosure relates to a liquid discharge device including: a discharge section that discharges a liquid; a storage section including a first surface and a second surface spaced apart from the first surface in a first direction, and configured to store the liquid between the first surface and the second surface; a transmission electrode provided at the first surface; a reception electrode provided at the second surface; a drive circuit that drives the transmission electrode; and a detection circuit that receives a reception signal from the reception electrode. The detection circuit includes a peak detection circuit that detects a peak value of the reception signal, a discharge switch provided at an output of the peak detection circuit, and a detection signal output circuit that outputs a detection signal for detecting a residual quantity of the liquid stored in the storage section based on the output of the peak detection circuit. The discharge switch is switched from on to off before a detection operation of the detection circuit.

BRIEF DESCRIPTION OF THE DRAWINGS

FIG. 9 shows examples of a predetermined event.

DESCRIPTION OF EXEMPLARY EMBODIMENTS

Hereinafter, a preferred embodiment of the present disclosure will be described in detail. The embodiment to be described below does not unduly limit contents described in the claims, and not all configurations described in the embodiment are necessarily essential constituent elements.

1. Liquid Discharge Device, Circuit Device, and Ink Tank

Figure 1:
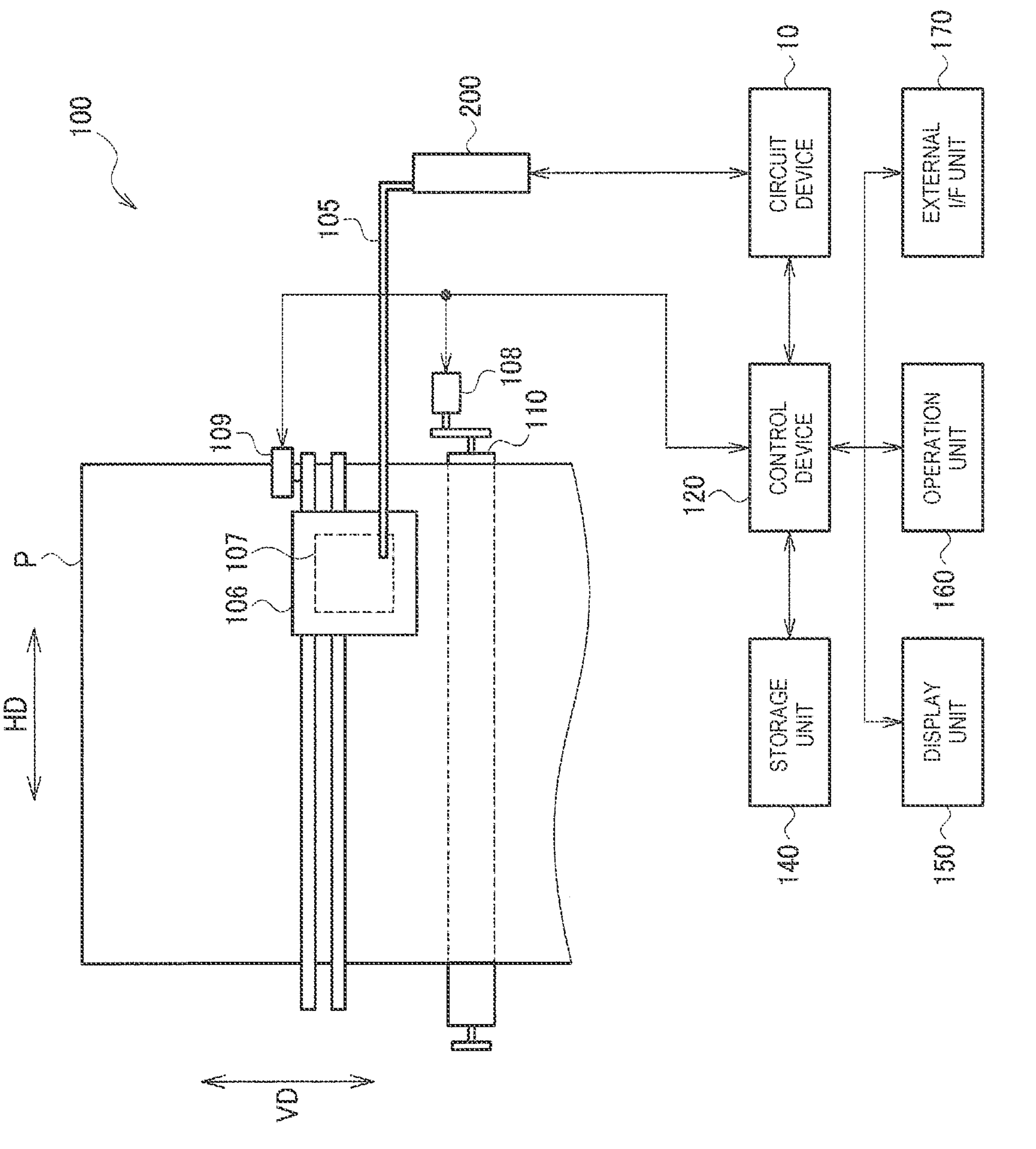
FIG. 1 shows a configuration example of a liquid discharge device.

FIG. 1 shows a configuration example of a liquid discharge device. An example in which the liquid discharge device is an electronic device having a printing function, such as a printing device or a multi-function device, will be described below. The liquid discharge device may be any device that stores a liquid and discharges the liquid. For example, the liquid discharge device may be a beverage vending machine, a production machine for producing products using a solution, a heating instrument using kerosene as a fuel, or an automobile using gasoline or light oil.

A liquid discharge device 100 in FIG. 1 includes a circuit device 10, a tube 105, a carriage 106, a sheet feed motor 108, a carriage motor 109, a sheet feed roller 110, a control device 120, a storage unit 140, a display unit 150, an operation unit 160, an external I/F unit 170, and an ink tank 200. Although FIG. 1 shows an example in which one ink tank is provided, a plurality of ink tanks may be provided. FIG. 1 is a diagram showing a connection relationship of units of the liquid discharge device 100, and does not limit a physical structure or a positional relationship of the units. For example, although FIG. 1 shows an off-carriage system in which the ink tank 200 is provided at a location different from the carriage 106, an on-carriage system in which the ink tank 200 is mounted on the carriage 106 may be used.

A print head 107 is mounted on the carriage 106. The print head 107 includes nozzles for ejecting ink to a bottom surface side of the carriage 106. The tube 105 is provided between the print head 107 and the ink tank 200. The ink in the ink tank 200 is sent to the print head 107 via the tube 105. The print head 107 ejects, as ink droplets, the ink sent from the ink tank 200 onto a print medium P from the nozzles. The print head 107 is also referred to as a discharge section, the ink tank 200 is also referred to as a storage section, and the ink is also referred to as a liquid.

The carriage 106 is driven by the carriage motor 109 to reciprocate on the print medium P along a main scanning axis HD. The sheet feed motor 108 rotationally drives the sheet feed roller 110 and conveys the print medium P along a sub-scanning axis VD. Ejection of the print head 107 is controlled by the control device 120 via a cable.

Under control of the control device 120, the liquid discharge device 100 prints on the print medium P by ejecting ink from the nozzles of the print head 107 onto the print medium P conveyed along the sub-scanning axis VD while the carriage 106 moves along the main scanning axis HD.

One end portion of the main scanning axis HD in a movement area of the carriage 106 is a home position area where the carriage 106 stands by. For example, a cap or the like (not shown) for performing maintenance such as cleaning the nozzles of the print head 107 is disposed in the home position area. Cleaning refers to cleaning the inside of the print head by suctioning the print head with a pump or the like provided in a waste ink box without driving the print head 107.

The operation unit 160 and the display unit 150 as a user interface unit are coupled to the control device 120. The display unit 150 is for displaying various display screens, and can be implemented by, for example, a liquid crystal display or an organic EL display. The operation unit 160 is used by a user to perform various operations, and can be implemented by various buttons, a GUI, and the like. The display unit 150 and the operation unit 160 may be integrally formed by a touch panel.

The control device 120 controls the carriage motor 109 to perform drive control for moving the carriage 106. Based on the drive control, the carriage motor 109 drives the print head 107 provided on the carriage 106 to move.

An external device such as a personal computer can be coupled to the control device 120 via the external I/F unit 170. The control device 120 receives image data from the external device via the external I/F unit 170, and controls the liquid discharge device 100 to print an image on the print medium P.

The ink tank 200 is provided with a transmission electrode and a reception electrode. The circuit device 10 drives the transmission electrode and outputs a detection signal for detecting an ink level to the control device 120 based on a reception signal received by the reception electrode. The control device 120 detects the ink level based on the detection signal. Information on the detected ink level may be stored in, for example, the storage unit 140.

The control device 120 is, for example, a processor. The processor is a CPU, a microcomputer, a DSP, or the like. The CPU is an abbreviation for central processing unit, and the DSP is an abbreviation for digital signal processor. The storage unit 140 stores computer-readable instructions, and the processor executes the instructions to implement functions of each of the units of the liquid discharge device 100 as processing. The instruction here may be an instruction of an instruction set constituting a program, or an instruction for instructing a hardware circuit of the processor to perform an operation. The storage unit 140 is, for example, a semiconductor memory such as a RAM or a nonvolatile memory, a register, or a magnetic storage device such as a hard disk device.

Figure 2:
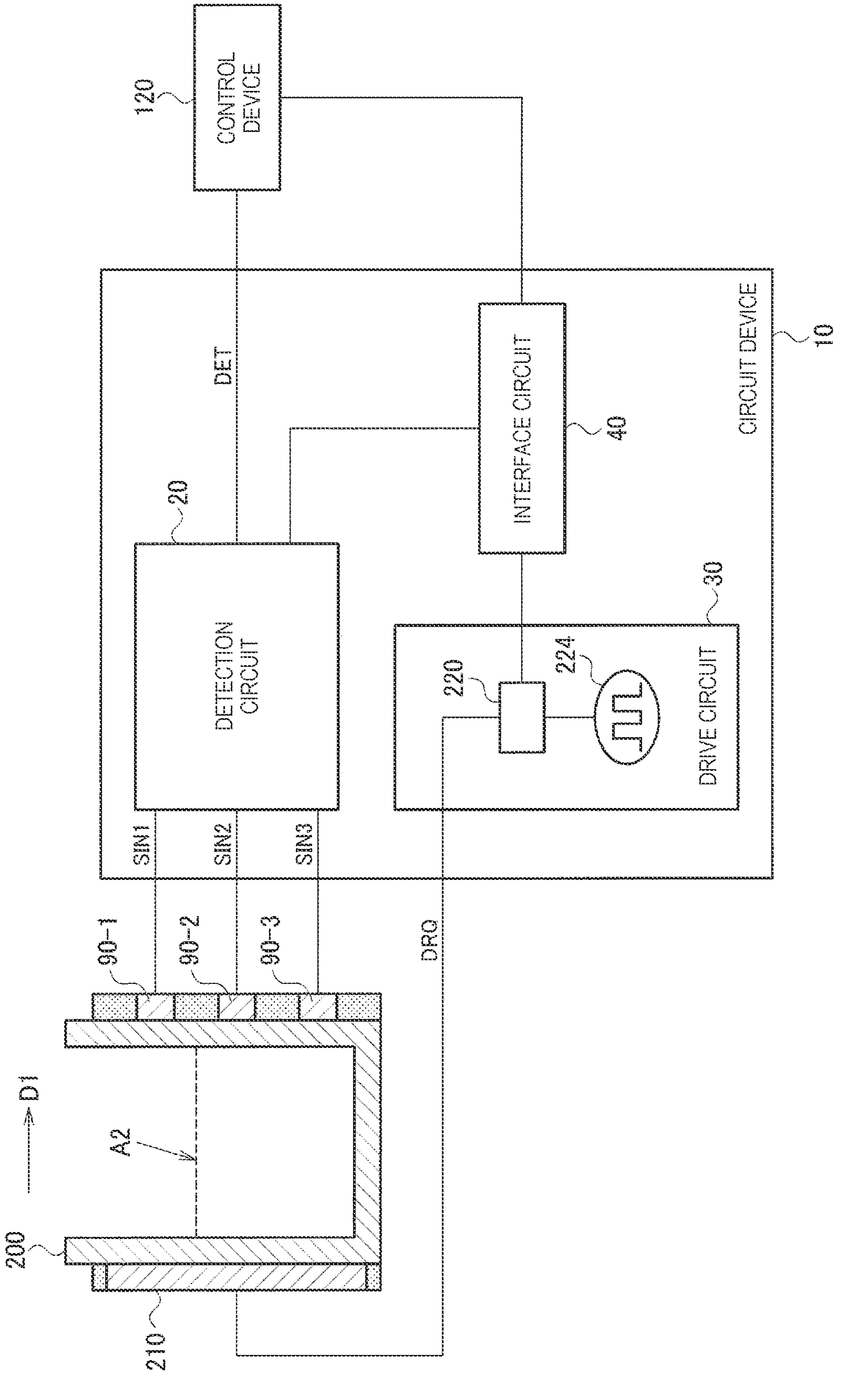
FIG. 2 shows a detailed configuration example of a circuit device and an ink tank.

FIG. 2 shows a detailed configuration example of the circuit device and the ink tank. The ink tank 200 is provided with a transmission electrode 210 and reception electrodes 90-1 to 90-3. The circuit device 10 includes a detection circuit 20, a drive circuit 30, and an interface circuit 40.

The circuit device 10 is, for example, an integrated circuit device in which a plurality of circuit elements are integrated on a semiconductor substrate.

One of two wall surfaces of the ink tank 200 that are spaced apart from each other in a first direction D1 is defined as a first surface, and the other is defined as a second surface. The first direction D1 is a horizontal direction. The transmission electrode 210 is provided on the first surface, and the reception electrodes 90-1 to 90-3 are provided on the second surface. When viewed in the first direction D1 from the first surface to the second surface, the transmission electrode 210 and the reception electrodes 90-1 to 90-3 overlap each other. The reception electrodes 90-1 to 90-3 are disposed at different positions in a height direction from a bottom surface of the ink tank 200. Specifically, the reception electrode 90-1 is provided at the highest position, and the reception electrode 90-3 is provided at the lowest position.

The drive circuit 30 outputs, as a drive signal, a pulse wave or a sine wave of a predetermined voltage to the transmission electrode 210. Specifically, the drive circuit 30 includes an AC power supply 224 and a transmission circuit 220 that outputs a drive signal based on the AC power supply 224.

The transmission electrode 210 and the reception electrodes 90-1 to 90-3 constitute parallel flat plates and capacitors. The capacitors including the transmission electrode 210, and the reception electrodes 90-1, 90-2, and 90-3 are referred to as a first capacitor, a second capacitor, and a third capacitor, respectively. When a liquid level is at A2 in FIG. 2, air is present and ink is absent between electrodes of the first capacitor. Therefore, a reception signal SIN1 having an amplitude of approximately 0 V is output from the reception electrode 90-1. On the other hand, ink is present between electrodes of the second capacitor and between electrodes of the third capacitor. Therefore, reception signals SIN2, SIN3 having amplitudes larger than the amplitude of the reception signal SIN1 are output from the reception electrodes 90-2, 90-3.

The detection circuit 20 detects whether ink is present between the electrodes of each of the first to third capacitors based on amplitude levels of the reception signals SIN1 to SIN3, and outputs a result as a detection signal DET. The control device 120 detects the ink level, which is a residual quantity of ink in the ink tank 200, based on the detection signal DET. When the liquid level is at A2 in FIG. 2, the control device 120 can determine that the ink level is between the reception electrodes 90-1 and 90-2.

The bottom surface of the ink tank 200 is provided with an ink discharge port (not shown). When the ink is discharged from the print head 107, an amount of ink stored in the ink tank 200 decreases, and the liquid level of A2 in FIG. 2 drops. Alternatively, when the ink is injected into the ink tank 200, the liquid level of A2 rises. The control device 120 can detect these changed ink levels.

The interface circuit 40 communicates with the control device 120 via a digital interface. Specifically, the control device 120 issues a command for controlling the circuit device 10, and the interface circuit 40 receives the command. The circuit device 10 operates based on the received command. For example, the control device 120 issues a detection command for instructing a detection operation, the drive circuit 30 outputs a drive signal based on the detection command, and the detection circuit 20 starts the detection operation. Alternatively, the control device 120 issues a discharge command for instructing a discharge operation of a peak detection circuit included in the detection circuit 20, and the peak detection circuit performs the discharge operation based on the discharge command.

Although FIG. 2 shows an example in which three reception electrodes are provided in the ink tank 200, one or more reception electrodes may be provided in the ink tank 200. For example, the ink tank 200 is provided with the number of reception electrodes corresponding to a resolution of ink residual quantity detection.

2. Detection Circuit

Figure 3:
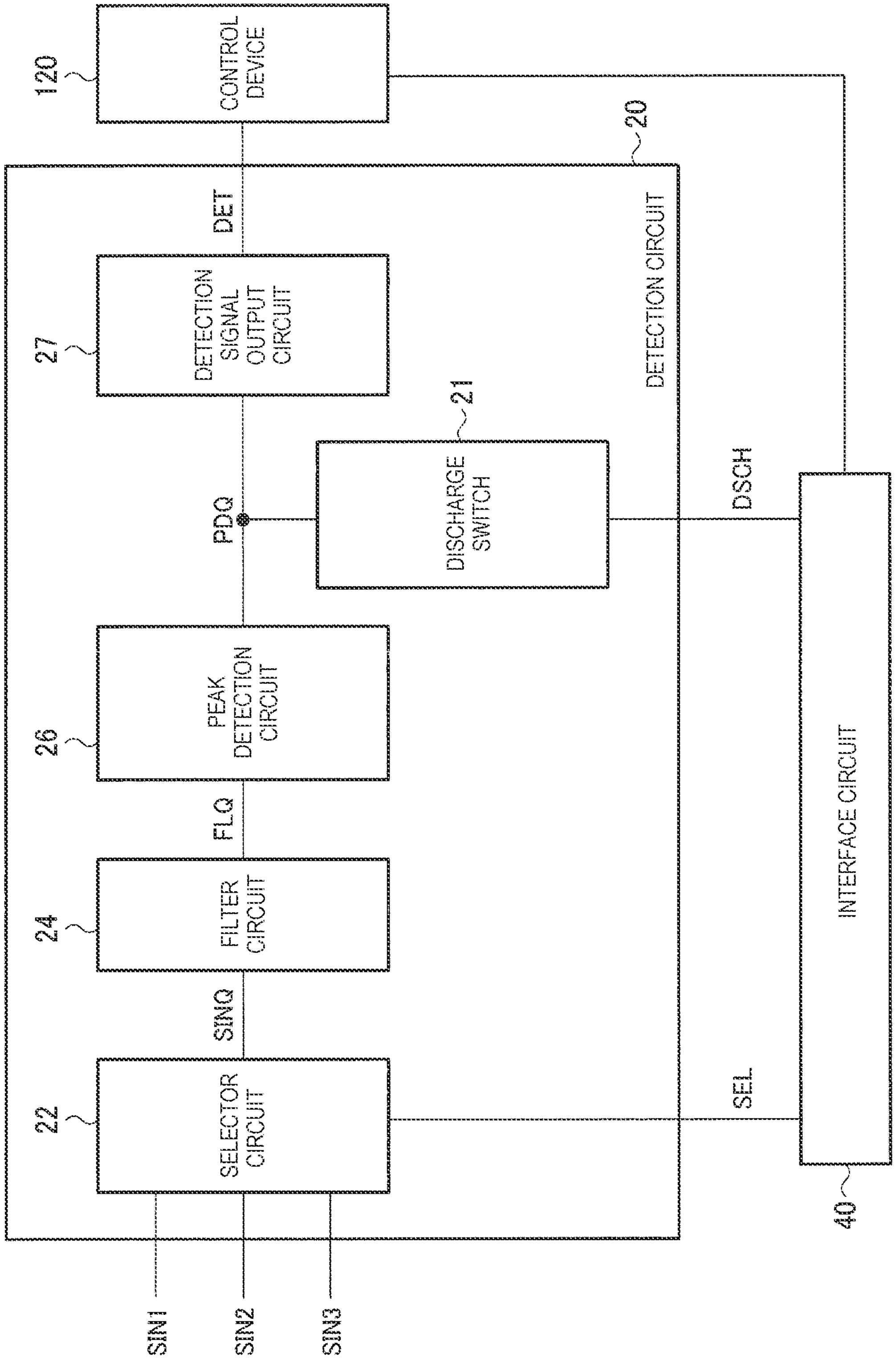
FIG. 3 shows a detailed configuration example of a detection circuit.

FIG. 3 shows a detailed configuration example of the detection circuit. The detection circuit 20 includes a selector circuit 22, a filter circuit 24, a peak detection circuit 26, a discharge switch 21, and a detection signal output circuit 27.

The selector circuit 22 selects one of the reception signals SIN1 to SIN3 from the reception electrodes 90-1 to 90-3 and outputs the selected reception signal as a reception signal SINQ. The control device 120 transmits a selection command for designating any one of the reception electrodes 90-1 to 90-3 together with a detection command. The interface circuit 40 outputs a selection signal SEL based on the selection command, and the selector circuit 22 selects a reception signal designated by the selection signal SEL from the reception signals SIN1 to SIN3.

The filter circuit 24 executes filter processing of removing a noise component of the reception signal SINQ, and outputs a filtered signal FLQ. Specifically, the filter circuit 24 is a band-pass filter circuit, and executes band-pass filter processing of passing a signal having a frequency of the AC power supply 224.

The peak detection circuit 26 detects a peak value of the filtered signal FLQ and outputs a signal PDQ having the peak value. The peak detection circuit 26 holds the signal PDQ having the peak value by a capacitor.

The detection signal output circuit 27 outputs the detection signal DET indicating presence or absence of ink between the electrodes based on the signal PDQ having the peak value. Specifically, the detection signal output circuit 27 compares the signal PDQ having the peak value with a threshold voltage, and outputs the detection signal DET based on a result. The detection signal DET is at a first logic level when the signal PDQ having the peak value is larger than the threshold voltage, and is at a second logic level when the signal PDQ having the peak value is smaller than the threshold voltage. For example, the first logic level is a high level, and the second logic level is a low level.

After acquiring the detection signal DET, the control device 120 transmits a discharge command. The interface circuit 40 outputs a discharge control signal DSCH based on the discharge command, and the discharge switch 21 resets the signal PDQ having the peak value held by the capacitor by discharging charges of the capacitor of the peak detection circuit 26 based on the discharge control signal DSCH.

Figure 4:
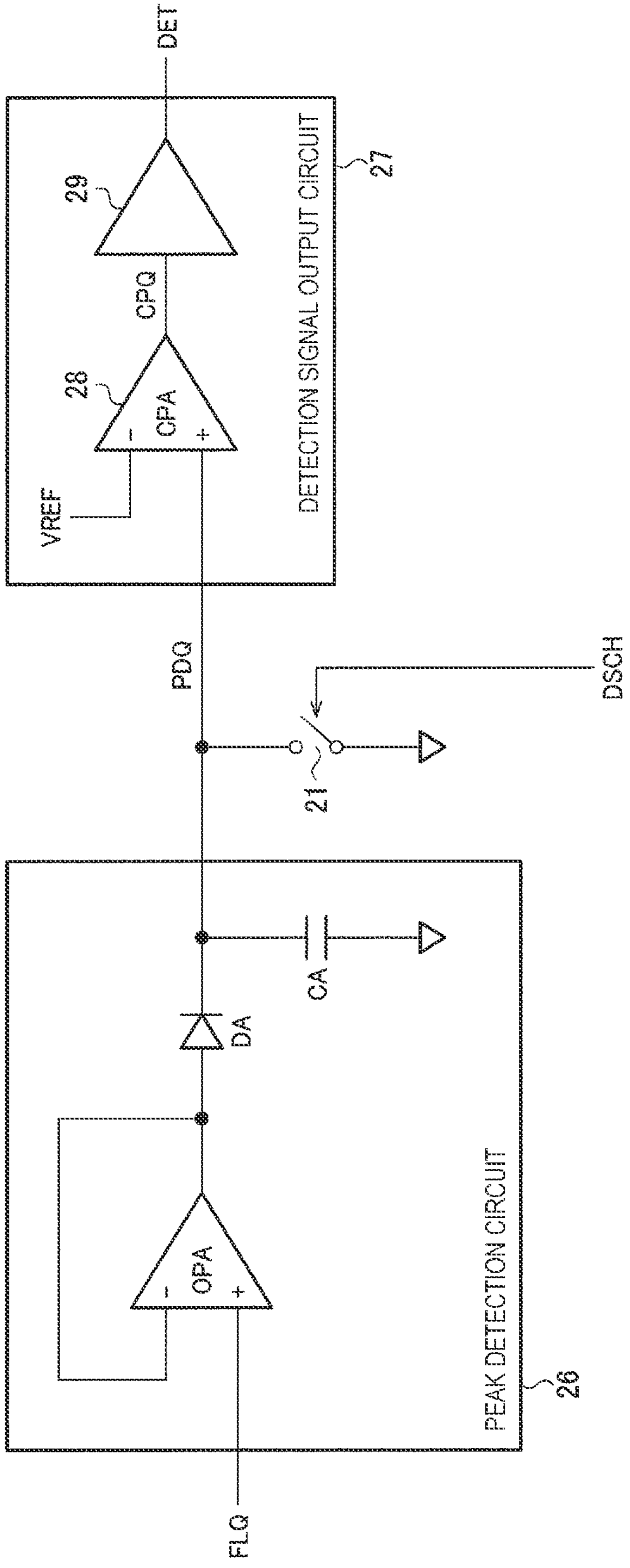
FIG. 4 shows a detailed configuration example of a peak detection circuit, a discharge switch, and a detection signal output circuit.

FIG. 4 shows a detailed configuration example of the peak detection circuit, the discharge switch, and the detection signal output circuit.

The peak detection circuit 26 includes an operational amplifier OPA, a diode DA, and a capacitor CA. A non-inverting input terminal of the operational amplifier OPA receives the filtered signal FLQ. An inverting input terminal of the operational amplifier OPA is coupled to an output terminal. An anode of the diode DA is coupled to the output terminal of the operational amplifier OPA, and a cathode of the diode DA is coupled to a first input terminal of a comparison circuit 28. One end of the capacitor CA is coupled to the first input terminal of the comparison circuit 28, and the other end of the capacitor CA is coupled to a ground node.

One end of the discharge switch 21 is coupled to the first input terminal of the comparison circuit 28, and the other end of the discharge switch 21 is coupled to a ground node.

The detection signal output circuit 27 includes the comparison circuit 28 and an output circuit 29. A threshold voltage VREF is input to a second input terminal of the comparison circuit 28. The comparison circuit 28 outputs a signal CPQ as a comparison result from an output terminal. The comparison circuit 28 is, for example, an analog comparator. The output circuit 29 buffers the signal CPQ as the comparison result and outputs the buffered signal CPQ to the control device 120 as the detection signal DET. The output circuit 29 is, for example, a buffer circuit.

In the example in FIG. 4, the first input terminal of the comparison circuit 28 is a non-inverting input terminal, and the second input terminal is an inverting input terminal. In this example, when PDQ>VREF, the detection signal DET is at a high level, indicating that ink is present between the electrodes. When PDQ<VREF, the detection signal DET is at a low level, indicating that ink is absent between the electrodes. The first input terminal of the comparison circuit 28 may be an inverting input terminal, and the second input terminal may be a non-inverting input terminal.

The discharge switch 21 is controlled to be turned on or off by the discharge control signal DSCH. When the discharge switch 21 is turned off, the signal PDQ having the peak value is held by the capacitor CA. When the discharge switch 21 is turned on, charges of the capacitor CA are discharged, and thus the signal having the peak value held by the capacitor CA is reset. The discharge switch 21 is an analog switch, for example, a P-type transistor, an N-type transistor, or a transfer gate in which a P-type transistor and an N-type transistor are coupled in parallel.

Figure 5:
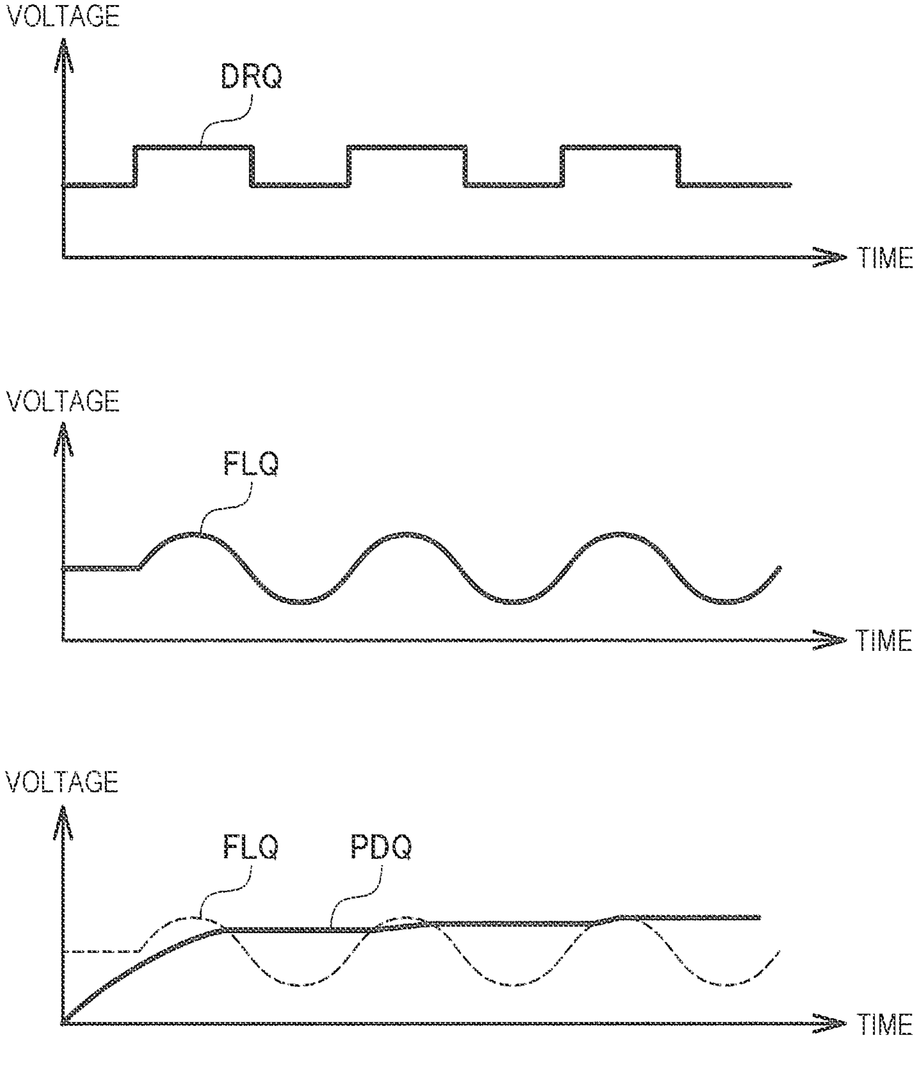
FIG. 5 shows examples of signal waveforms of a drive circuit and the detection circuit.

FIG. 5 shows examples of signal waveforms of the drive circuit and the detection circuit. The drive circuit 30 outputs a rectangular wave having a constant period to the transmission electrode 210 as a drive signal DRQ. The drive signal DRQ may be a sine wave having a constant period. The selector circuit 22 selects one of the reception signals SIN1 to SIN3, and the filter circuit 24 executes filter processing on the selected reception signal. The filtered signal FLQ is a sine wave signal having the same period as that of the drive signal DRQ. The discharge switch 21 of the peak detection circuit 26 is switched from on to off, and peak detection is started. The peak detection circuit 26 detects a peak value of the signal FLQ, and holds the peak value by the capacitor CA. Until the capacitor CA is charged, the signal PDQ having the peak value rises transiently. When the signal PDQ having the peak value reaches an upper limit of an amplitude of the signal FLQ, a signal level of the signal PDQ is maintained thereafter.

The comparison circuit 28 compares the signal PDQ with the threshold voltage VREF, and the output circuit 29 buffers the signal CPQ as a comparison result and outputs the buffered signal CPQ as the detection signal DET. The control device 120 acquires the detection signal DET after the signal level of the signal PDQ is stabilized, and determines an ink level based on the detection signal DET.

A period from a start of peak detection to acquisition of the detection signal DET by the control device 120 includes a plurality of periods of the signal FLQ. That is, in the embodiment, the charges of the capacitor CA are not reset for each period of the signal FLQ, and the charges of the capacitor CA are not reset until the control device 120 acquires the detection signal DET. As will be described later, since a detection operation is performed after the ink level changes, it can be assumed that a level change during the detection does not occur. Therefore, a reset operation synchronized with the period of the signal FLQ is not necessary in the embodiment.

Figure 6:
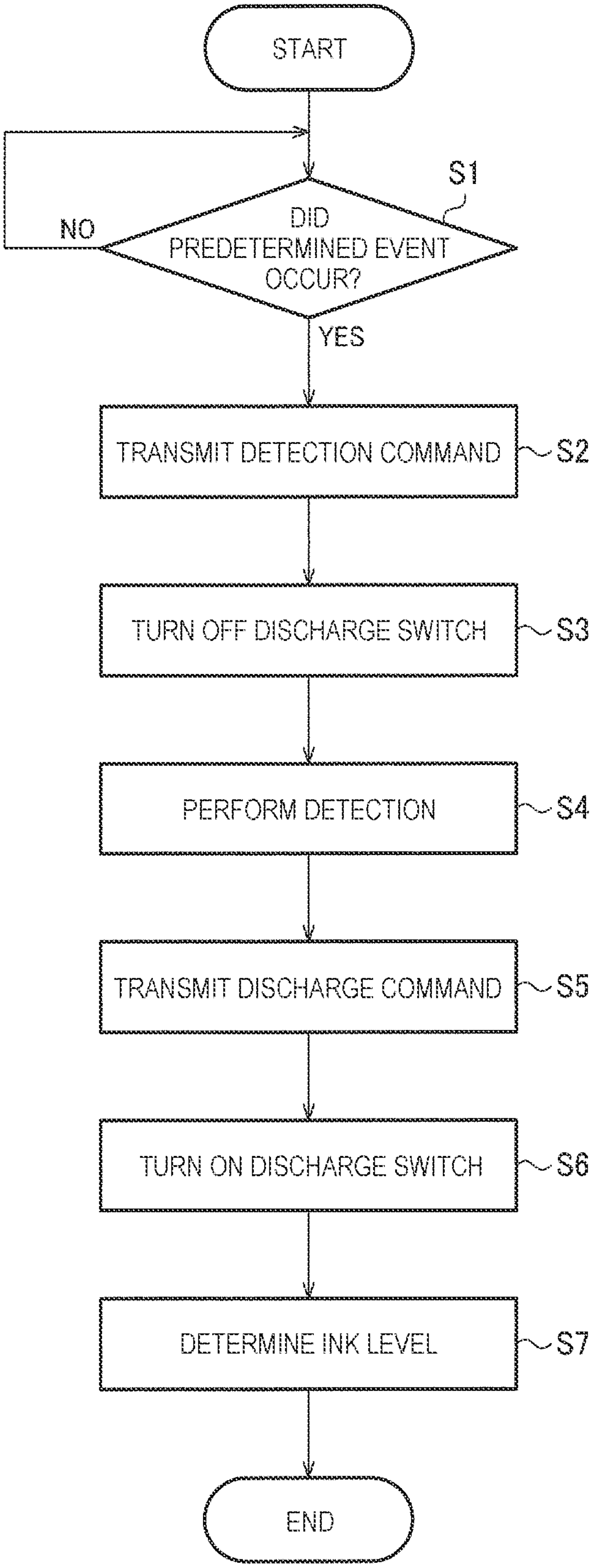
FIG. 6 is a first flowchart of ink level detection processing.

FIG. 6 is a first flowchart of ink level detection processing. In step S1, the control device 120 determines whether a predetermined event occurred in the liquid discharge device 100. The predetermined event is an event in which an amount of ink in the ink tank 200 increases or decreases, and is, for example, an operation involving ink discharge, or ink injection into the ink tank 200. A specific example of the predetermined event will be described later.

When the control device 120 determines in step S1 that the predetermined event did not occur, the processing returns to step S1 again.

When determining in step S1 that the predetermined event occurred, the control device 120 transmits a detection command to the interface circuit 40 in step S2.

In step S3, the discharge switch 21 is turned off. Specifically, the interface circuit 40 changes the discharge control signal DSCH from active to inactive based on the detection command, whereby the discharge switch 21 is switched from on to off. When the interface circuit 40 changes a drive control signal to the drive circuit 30 from inactive to active based on the detection command, the drive circuit 30 starts to transmit the drive signal DRQ.

In step S4, the detection circuit 20 performs a detection operation. Specifically, the detection circuit 20 performs peak detection based on a reception signal from the reception electrode, detects presence or absence of ink between the electrodes based on a peak value, and outputs a result as the detection signal DET. The control device 120 acquires the detection signal DET.

In step S5, the control device 120 transmits a discharge command to the interface circuit 40.

In step S6, the discharge switch 21 is turned on. Specifically, the interface circuit 40 changes the discharge control signal DSCH from inactive to active based on the discharge command, whereby the discharge switch 21 is switched from off to on. Accordingly, the peak value held by the peak detection circuit 26 is reset.

In step S7, the control device 120 determines an ink level based on the acquired detection signal DET. Step S7 may be executed before step S5.

In the embodiment described above, the liquid discharge device 100 includes a discharge section that discharges a liquid, a storage section, the transmission electrode 210 provided at a first surface, a reception electrode provided at a second surface, the drive circuit 30 that drives the transmission electrode 210, and the detection circuit 20 that receives a reception signal from the reception electrode. The storage section includes the first surface and the second surface spaced apart from the first surface in the first direction D1, and is configured to store the liquid between the first surface and the second surface. The detection circuit 20 includes the peak detection circuit 26 that detects a peak value of the reception signal, the discharge switch 21 provided at an output of the peak detection circuit 26, and the detection signal output circuit 27. The detection signal output circuit 27 outputs the detection signal DET for detecting a residual quantity of the liquid stored in the storage section based on the output of the peak detection circuit 26. The discharge switch 21 is switched from on to off before a detection operation of the detection circuit 20.

According to the embodiment, since the discharge switch 21 goes through an on state before the detection operation, the output of the peak detection circuit 26 is reset at a start of the detection operation. Accordingly, even when the residual quantity of the liquid changes from the previous detection operation, a liquid level is appropriately detected. When the discharge switch 21 is switched from on to off before the detection operation, a reset state of the output of the peak detection circuit 26 is released, and the peak detection circuit 26 can detect the peak value of the reception signal.

In the examples in FIGS. 1 and 2, ink corresponds to the liquid, the print head 107 corresponds to the discharge section, and the ink tank 200 corresponds to the storage section. The reception electrode may be any one of the plurality of reception electrodes 90-1 to 90-3 provided on the ink tank 200.

In the embodiment, the discharge switch 21 is switched from on to off after a liquid discharge operation performed by the discharge section. The detection circuit 20 performs the detection operation after the discharge switch 21 is switched from on to off.

When the discharge operation is performed, the residual quantity of the liquid stored in the storage section decreases, and the liquid level drops. When the discharge switch 21 is switched from on to off after the discharge operation, peak detection can be performed in a state in which the output of the peak detection circuit 26 is reset, and thus a drop in the liquid level can be coped with.

In the embodiment, the discharge switch 21 is turned off during the detection operation.

According to the embodiment, the output of the peak detection circuit 26 is not reset for each period of the reception signal, and the output of the peak detection circuit 26 is not reset until the detection operation ends. This eliminates a need for resetting in synchronization with a peak of a periodic waveform of the reception signal, thereby eliminating a need for a circuit that generates a reset pulse synchronized with the peak of the periodic waveform of the reception signal.

In the embodiment, the liquid discharge device 100 includes the control device 120 that controls the detection circuit 20. The discharge switch 21 is switched from off to on based on a discharge command from the control device 120.

According to the embodiment, the discharge switch 21 can be switched from off to on by the control device 120 transmitting the discharge command. The control device 120 transmits the discharge command, for example, after liquid level detection is performed or before liquid level detection is performed.

In the embodiment, the liquid discharge device 100 includes the control device 120 that controls the detection circuit 20. The discharge switch 21 is switched from on to off based on a detection command from the control device 120. The detection circuit 20 performs the detection operation after the discharge switch 21 is switched from on to off.

According to the embodiment, by the control device 120 transmitting the detection command, the discharge switch 21 can be switched from on to off, and then the detection circuit 20 can perform the detection operation.

In the embodiment, the detection signal output circuit 27 includes the comparison circuit 28 that compares the peak value, which is the output of the peak detection circuit 26, with a threshold, and outputs the detection signal DET based on a comparison result of the comparison circuit 28.

According to the embodiment, the comparison circuit 28 compares the peak value, which is the output of the peak detection circuit 26, with the threshold, whereby the presence or absence of the ink between the electrodes can be detected.

The threshold is set to a value smaller than the peak value when the ink is present and larger than the peak value when the ink is absent. In FIG. 4, "the detection signal DET based on the comparison result of the comparison circuit 28" is an output of the output circuit 29 that buffers the signal CPQ output by the comparison circuit 28. The detection signal DET may be a signal based on the comparison result of the comparison circuit 28. For example, the output circuit 29 may be omitted, and the signal CPQ, which is the comparison result of the comparison circuit 28, may be output to the control device 120 as the detection signal DET.

In the embodiment, the peak detection circuit 26 includes the operational amplifier OPA, the diode DA, and the capacitor CA. A non-inverting input terminal of the operational amplifier OPA receives the signal FLQ based on the reception signal. An output terminal of the operational amplifier OPA is coupled to an inverting input terminal. An anode of the diode DA is coupled to the output terminal of the operational amplifier OPA. A cathode of the diode DA is coupled to one end of the discharge switch 21. One end of the capacitor CA is coupled to the cathode of the diode DA.

According to the embodiment, the operational amplifier OPA is formed as a voltage follower circuit, and the voltage follower circuit buffers the signal FLQ based on the reception signal. When a potential difference between both ends of the diode DA is in a forward direction, an output voltage of the voltage follower circuit is applied to one end of the capacitor CA, and thus the capacitor CA holds a peak value of the output voltage of the voltage follower circuit. Since the peak detection circuit 26 according to the embodiment does not include a sampling circuit, a circuit that generates a sampling pulse synchronized with a peak of a periodic waveform of the reception signal is not necessary.

In the embodiment, the liquid discharge device 100 includes a reception electrode group provided at the second surface of the storage section. The detection circuit 20 includes the selector circuit 22 and the filter circuit 24. The selector circuit 22 receives a reception signal group from the reception electrode group. The filter circuit 24 executes filter processing on the reception signal SINQ selected by the selector circuit 22 from the reception signal group, and outputs the filtered reception signal SINQ to the peak detection circuit 26.

According to the embodiment, since the selector circuit 22 is provided, it is not necessary to provide a detection circuit for each reception electrode, and a circuit scale of the circuit device 10 can be reduced. The filter circuit 24 executes filter processing on the reception signal SINQ selected by the selector circuit 22, thereby reducing noise in the reception signal SINQ. This enables accurate ink level detection.

In the example in FIG. 2, the reception electrodes 90-1 to 90-3 correspond to the reception electrode group, and the reception signals SIN1 to SIN3 correspond to the reception signal group. The number of electrodes included in the reception electrode group may be one or more.

Figure 7:
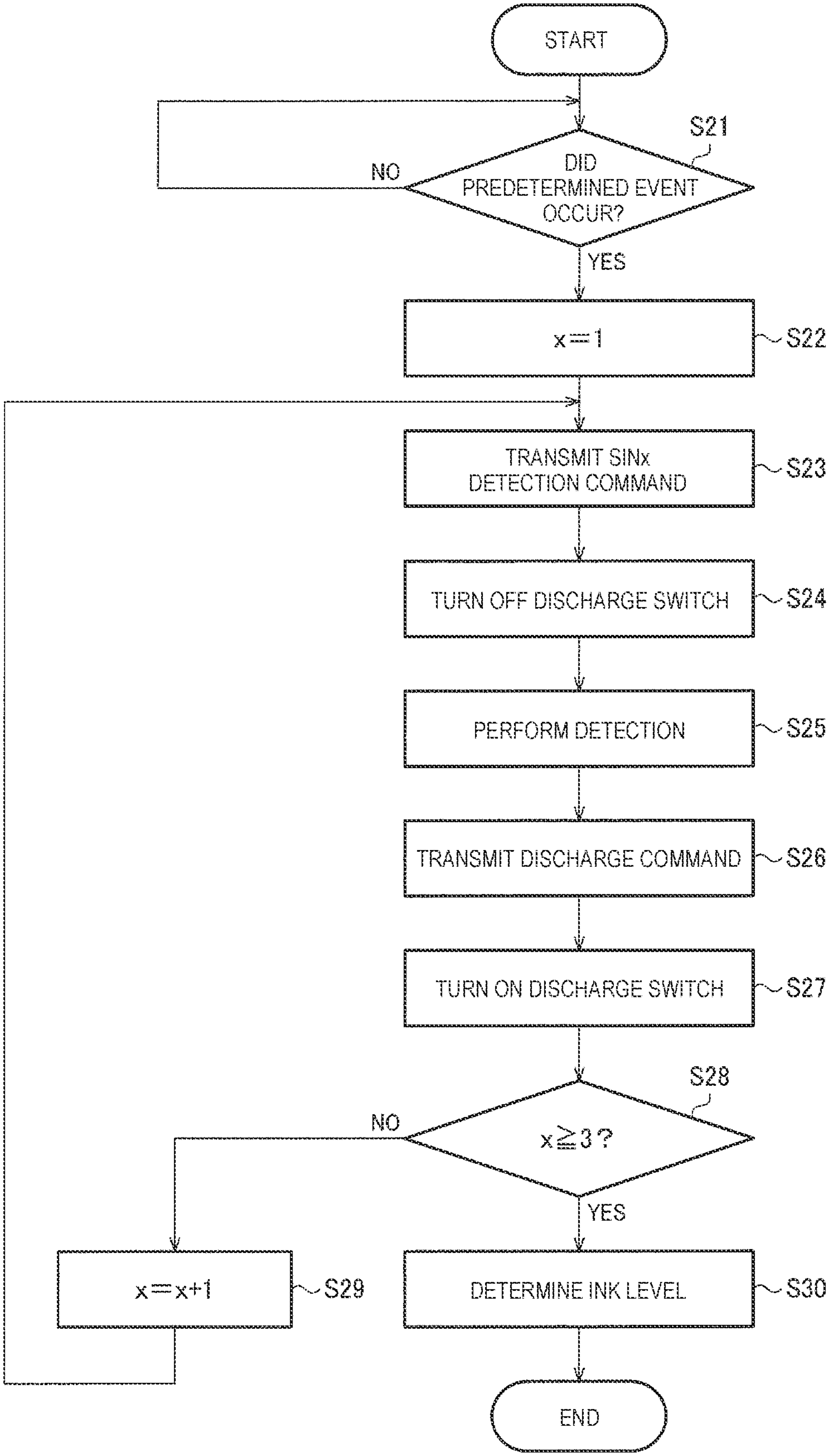
FIG. 7 is a second flowchart of the ink level detection processing.

FIG. 7 is a second flowchart of the ink level detection processing. Step S21 is the same as step S1 in FIG. 6.

When determining in step S21 that a predetermined event occurred, the control device 120 sets a variable x indicating which of the reception electrodes 90-1 to 90-3 is selected to an initial value in step S22. For example, the initial value of x is 1.

In step S23, the control device 120 transmits, to the interface circuit 40, a detection command for instructing a detection operation on a reception signal SINx.

In step S24, the discharge switch 21 is turned off, and the drive circuit 30 starts to transmit the drive signal DRQ. Step S23 is the same as step S3 in FIG. 6.

In step S25, the detection circuit 20 performs the detection operation on the reception signal SINx. Specifically, the detection circuit 20 performs peak detection based on the reception signal SINx from a reception electrode 90-*x*, detects presence or absence of ink between the electrodes based on a peak value, and outputs a result as the detection signal DET. The control device 120 acquires the detection signal DET.

In step S26, the control device 120 transmits a discharge command to the interface circuit 40.

In step S27, the discharge switch 21 is turned on. Step S27 is the same as step S6 in FIG. 6.

In step S28, the control device 120 determines whether x is equal to or larger than the number of reception electrodes. In the example in FIG. 2, the number of reception electrodes is three.

When determining in step S28 that x is smaller than the number of reception electrodes, the control device 120 sets x=x+1 in step S29, and the processing returns to step S23.

When determining in step S29 that x is equal to or larger than the number of reception electrodes, the control device 120 determines an ink level based on the acquired detection signal DET in step S30.

In the embodiment described above, the discharge switch 21 is switched from on to off when the selector circuit 22 switches the reception signal to be selected.

Whether the ink is present between the transmission electrode and the reception electrode differs for each reception electrode. According to the embodiment, when the selector circuit 22 switches the reception signal to be selected, the discharge switch 21 is switched from on to off, whereby the peak detection can be performed in a state in which the output of the peak detection circuit 26 is reset. Accordingly, the presence or absence of the ink is appropriately detected for each reception electrode.

Figure 8:
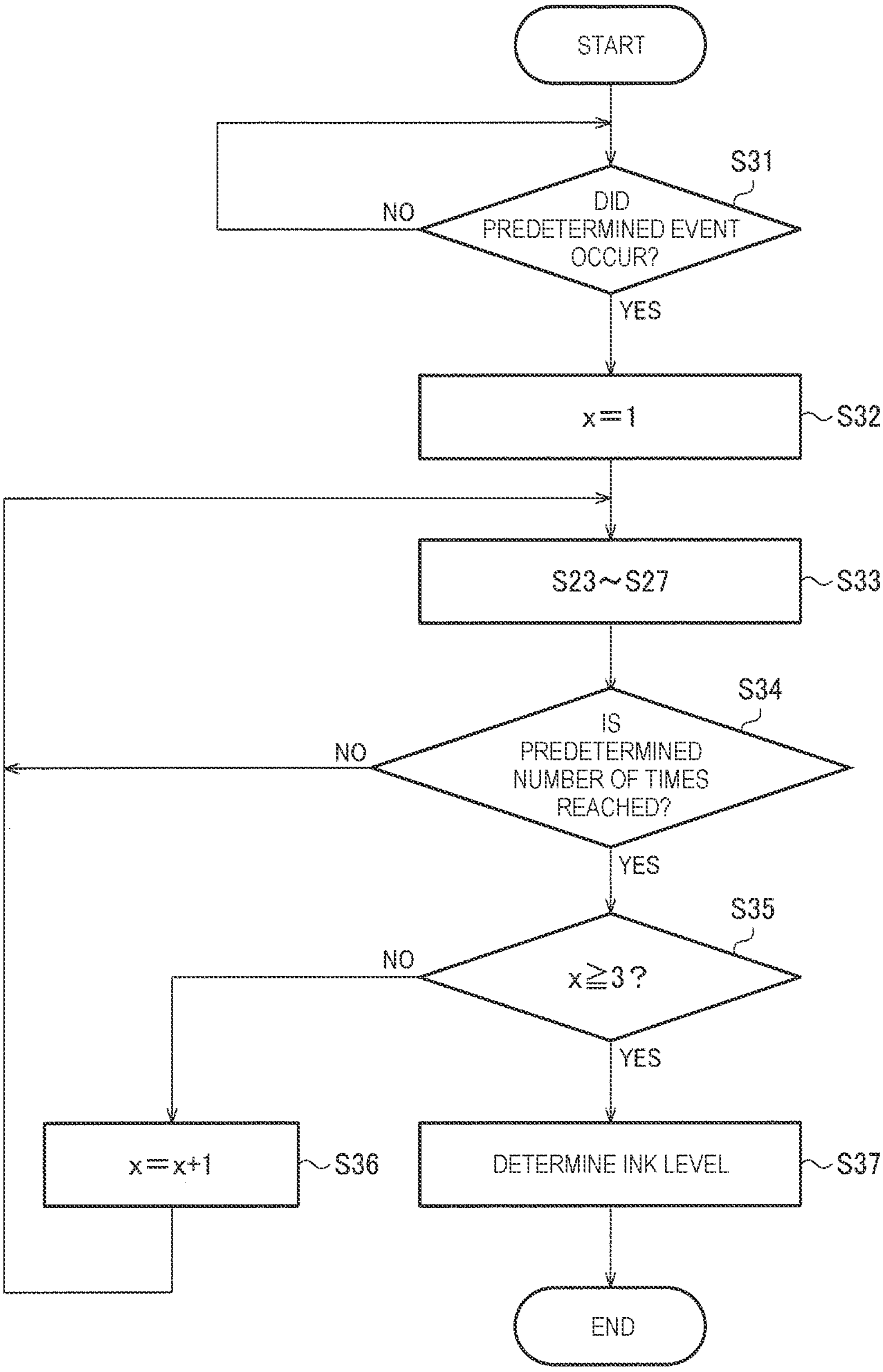
FIG. 8 is a third flowchart of the ink level detection processing.

FIG. 8 is a third flowchart of the ink level detection processing. Steps S31 and S32 are the same as steps S21 and S22 in FIG. 7.

In step S33, the control device 120 and the circuit device 10 turn off the discharge switch, perform the detection operation on the reception signal SINx, and turn on the discharge switch, as in steps S23 to S27 in FIG. 7.

In step S34, the control device 120 determines whether the detection operation on the reception signal SINx is performed a predetermined number of times.

When the control device 120 determines in step S34 that the detection operation on the reception signal SINx is not performed the predetermined number of times, the processing returns to step S33.

When the control device 120 determines in step S34 that the detection operation on the reception signal SINx is performed the predetermined number of times, the processing proceeds to step S35. Steps S35 and S36 are the same as steps S28 and S29 in FIG. 7.

In step S37, the control device 120 determines an ink level based on the acquired detection signal DET. In this flow, detection results for the predetermined number of times are obtained for one reception signal SINx. The control device 120 determines presence or absence of ink between the reception electrode 90-*x* and the transmission electrode 210 based on the detection results for the predetermined number of times. For example, the control device 120 determines that ink is present when all the detection results indicate that ink is present, and determines that ink is absent when all the detection results indicate that ink is absent. Otherwise, the control device 120 re-performs ink level detection on the reception electrodes 90-*x*, for example. The control device 120 determines a liquid level of the ink based on ink presence and absence determination for each of the reception electrodes 90-1 to 90-3.

In the embodiment described above, the liquid discharge device 100 includes the control device 120 that controls the detection circuit 20. The detection circuit 20 outputs a plurality of detection results by performing the detection operation a plurality of times based on a plurality of detection commands from the control device 120. The control device 120 detects a residual quantity of the liquid stored in the storage section based on the plurality of detection results.

According to the embodiment, the residual quantity of the liquid stored in the storage section is detected based on the plurality of detection results, and thus a possibility of erroneous detection can be reduced. For example, the peak detection circuit 26 may hold an erroneous peak value due to noise in a reception signal, and the detection signal output circuit 27 may output the detection signal DET for erroneous determination of ink presence and absence. According to the embodiment, since ink presence and absence determination is performed a plurality of times for one reception electrode, a possibility of erroneous detection of an ink level can be reduced by detecting the ink level based on the determination.

In FIG. 8, "performing the detection operation the plurality of times" corresponds to performing the detection operation the predetermined number of times in steps S33 and S34.

In the embodiment, the discharge switch 21 is switched from off to on based on a discharge command from the control device 120 after the detection circuit 20 performs the detection operation the plurality of times.

According to the embodiment, even when the peak detection circuit 26 holds the erroneous peak value, the output of the peak detection circuit 26 is reset by switching the discharge switch 21 from off to on after the detection operations. This makes it possible to determine presence or absence of the ink between the electrodes without being affected by the previous detection result in the detection operations.

FIG. 9 shows examples of the predetermined event in steps S1, S21, and S31.

In Examples 1 and 2, the predetermined event is an event related to a printing operation. The printing operation means that the liquid discharge device 100, which is a printing device, prints on a print medium. In the example in FIG. 1, the printing operation is that the ink is sent from the ink tank 200 to the print head 107, and the print head 107 ejects the ink from the nozzles to the print medium P conveyed along the sub-scanning axis VD while the carriage 106 moves along the main scanning axis HD.

In Example 1, the predetermined event is the printing operation on a predetermined number of print media. For example, the print medium is a sheet having a predetermined size, and the control device 120 counts the number of printed sheets. The control device 120 executes ink level detection processing when a count value of the number of sheets increases by a predetermined value from the count value at the time of the previous ink level detection processing.

In Example 2, the predetermined event is the printing operation on a predetermined number of print media according to a print mode. The print mode is set according to print setting. For example, the print mode is set according to color printing, monochrome printing, or a size of a print medium. The number of sheets for which ink level detection is performed is set in each mode, and the number of sheets for each mode can be set independently.

In the embodiment described above, the liquid discharge device 100 performs a printing operation of discharging the liquid, which is ink, from the discharge section onto a print medium. The discharge switch 21 is switched from on to off after the printing operation. The detection circuit 20 performs the detection operation after the discharge switch 21 is switched from on to off.

When the printing operation is performed, the residual quantity of the ink stored in the ink tank 200 decreases, and the liquid level of the ink drops. When the discharge switch 21 is switched from on to off after the printing operation, the peak detection can be performed in a state in which the output of the peak detection circuit 26 is reset, and thus a drop in the liquid level can be coped with.

In the embodiment, the discharge switch 21 is switched from on to off after the printing operation on a predetermined number of sheets.

According to the embodiment, the detection operation is performed after the printing operation on the predetermined number of sheets, in which the liquid level of the ink is considered to decrease to a certain extent due to consumption of the ink. This makes it possible to detect the ink level at an appropriate frequency.

In the embodiment, the predetermined number of sheets is set according to a print mode of the printing operation.

An ink consumption amount for each sheet differs due to the print mode. For example, a consumption amount of each color ink differs between color printing and monochrome printing. According to the embodiment, since the predetermined number of sheets changes due to the print mode, ink level detection can be performed at an appropriate interval according to the ink consumption amount in each print mode.

In Example 3, the predetermined event is nozzle cleaning. The nozzle cleaning refers to cleaning the nozzles to remove clogging or the like of the nozzles for discharging the ink. For example, the nozzle cleaning refers to cleaning the inside of the print head by suctioning the print head with the pump or the like provided in the waste ink box.

In the embodiment described above, the discharge switch 21 is switched from on to off after a nozzle cleaning operation on the discharge section. The detection circuit 20 performs the detection operation after the discharge switch 21 is switched from on to off.

When nozzle cleaning is performed, the residual quantity of the ink stored in the ink tank 200 decreases, and the liquid level of the ink drops. When the discharge switch 21 is switched from on to off after the nozzle cleaning, the peak detection can be performed in a state in which the output of the peak detection circuit 26 is reset, and thus a drop in the liquid level can be coped with.

In Examples 4 and 5, the predetermined event is an event related to ink injection into the ink tank 200. Examples 1 to 3 are events in which the ink level of the ink tank 200 drops, and Examples 4 and 5 are events in which the ink level of the ink tank 200 rises.

In Example 4, the predetermined event is opening or closing of a lid of the ink tank 200 in an off-carriage system. The lid is for opening and closing an ink inlet of the ink tank 200. The lid of the ink tank 200 is provided with an opening and closing detection sensor using a Hall element or the like. The control device 120 detects opening or closing of the lid based on a signal from the opening and closing detection sensor.

In Example 5, the predetermined event is that the carriage 106 moved to an ink injection position in an on-carriage system. The ink injection position is a position of the carriage 106 on the main scanning axis HD for injecting ink into the ink tank 200 mounted on the carriage 106. The ink injection position is, for example, a position for performing maintenance on the carriage 106 or the ink tank 200, and is, for example, a center of the main scanning axis HD.

In the embodiment described above, the discharge switch 21 is switched from on to off after the liquid is injected into the storage section. The detection circuit 20 performs the detection operation after the discharge switch 21 is switched from on to off.

When the ink is injected into the ink tank 200, the residual quantity of the ink stored in the ink tank 200 changes, and the liquid level of the ink changes. When the discharge switch 21 is switched from on to off after ink injection, the peak detection can be performed in a state in which the output of the peak detection circuit 26 is reset, and thus a change in the liquid level can be coped with.

In the embodiment, in an off-carriage system in which the storage section is not mounted on the carriage 106 that scans the discharge section, the discharge switch 21 is switched from on to off after opening of a lid of the storage section is detected or closing of a lid of the storage section is detected.

According to the embodiment, the ink injection can be detected by detecting the opening or closing of the lid of the ink tank 200 in the off-carriage system, which can be used as a trigger to turn off the discharge switch 21 and perform the detection operation.

In the embodiment, in an on-carriage system in which the storage section is mounted on a carriage that scans the discharge section, the discharge switch 21 is switched from on to off when the carriage 106 is disposed at an injection position where the liquid is injected into the storage section.

According to the embodiment, the ink injection can be detected by detecting that the carriage 106 is disposed at the injection position in the on-carriage system, which can be used as a trigger to turn off the discharge switch 21 and perform the detection operation.

3. Overview

A liquid discharge device according to the embodiment described above includes a discharge section that discharges a liquid, a storage section, a transmission electrode provided at a first surface, a reception electrode provided at a second surface, a drive circuit that drives the transmission electrode, and a detection circuit that receives a reception signal from the reception electrode. The storage section includes the first surface and the second surface spaced apart from the first surface in a first direction, and is configured to store the liquid between the first surface and the second surface. The detection circuit includes a peak detection circuit that detects a peak value of the reception signal, a discharge switch provided at an output of the peak detection circuit, and a detection signal output circuit that outputs a detection signal for detecting a residual quantity of the liquid stored in the storage section based on the output of the peak detection circuit. The discharge switch is switched from on to off before a detection operation of the detection circuit.

According to the embodiment, since the discharge switch goes through an on state before the detection operation, the output of the peak detection circuit is reset at a start of the detection operation. Accordingly, even when the residual quantity of the liquid changes from the previous detection operation, a liquid level is appropriately detected. When the discharge switch is switched from on to off before the detection operation, a reset state of the output of the peak detection circuit is released, and the peak detection circuit can detect the peak value of the reception signal.

In the embodiment, the discharge switch may be switched from on to off after a liquid discharge operation performed by the discharge section. The detection circuit may perform the detection operation after the discharge switch is switched from on to off.

When the discharge operation is performed, the residual quantity of the liquid stored in the storage section decreases, and the liquid level drops. When the discharge switch is switched from on to off after the discharge operation, peak detection can be performed in a state in which the output of the peak detection circuit is reset, and thus a drop in the liquid level can be coped with.

In the embodiment, the liquid discharge device may perform a printing operation of discharging the liquid, which is ink, from the discharge section onto a print medium. The discharge switch may be switched from on to off after the printing operation. The detection circuit may perform the detection operation after the discharge switch is switched from on to off.

When the printing operation is performed, the residual quantity of the ink stored in the storage section decreases, and the liquid level of the ink drops. When the discharge switch is switched from on to off after the printing operation, the peak detection can be performed in a state in which the output of the peak detection circuit is reset, and thus a drop in the liquid level of the ink can be coped with.

In the embodiment, the discharge switch may be switched from on to off after the printing operation on a predetermined number of sheets.

According to the embodiment, the detection operation is performed after the printing operation on the predetermined number of sheets, in which the liquid level of the ink is considered to decrease to a certain extent due to consumption of the ink. This makes it possible to detect the liquid level of the ink at an appropriate frequency.

In the embodiment, the predetermined number of sheets may be set according to a print mode of the printing operation.

An ink consumption amount for each sheet differs due to the print mode. For example, a consumption amount of each color ink differs between color printing and monochrome printing. According to the embodiment, since the predetermined number of sheets changes due to the print mode, ink level detection can be performed at an appropriate interval according to the ink consumption amount in each print mode.

In the embodiment, the discharge switch may be switched from on to off after a nozzle cleaning operation on the discharge section. The detection circuit may perform the detection operation after the discharge switch is switched from on to off.

When nozzle cleaning is performed, the residual quantity of the ink stored in the storage section decreases, and the liquid level of the ink drops. When the discharge switch is switched from on to off after the nozzle cleaning, the peak detection can be performed in a state in which the output of the peak detection circuit is reset, and thus a drop in the liquid level of the ink can be coped with.

In the embodiment, the discharge switch may be switched from on to off after the liquid is injected into the storage section. The detection circuit may perform the detection operation after the discharge switch is switched from on to off.

When the liquid is injected into the storage section, the residual quantity of the liquid stored in the storage section changes, and the liquid level changes. When the discharge switch is switched from on to off after injection of the liquid, the peak detection can be performed in a state in which the output of the peak detection circuit is reset, and thus a change in the liquid level can be coped with.

In the embodiment, in an off-carriage system in which the storage section is not mounted on a carriage that scans the discharge section, the discharge switch may be switched from on to off after opening of a lid of the storage section is detected or closing of the lid of the storage section is detected.

According to the embodiment, the injection of the liquid can be detected by detecting the opening or closing of the lid of the storage section in the off-carriage system, which can be used as a trigger to turn off the discharge switch and perform the detection operation.

In the embodiment, in an on-carriage system in which the storage section is mounted on a carriage that scans the discharge section, the discharge switch may be switched from on to off when the carriage is disposed at an injection position where the liquid is injected into the storage section.

According to the embodiment, the injection of the liquid can be detected by detecting that the carriage is disposed at the injection position in the on-carriage system, which can be used as a trigger to turn off the discharge switch and perform the detection operation.

In the embodiment, the discharge switch may be turned off during the detection operation.

According to the embodiment, the output of the peak detection circuit is not reset for each period of the reception signal, and the output of the peak detection circuit is not reset until the detection operation ends. This eliminates a need for resetting in synchronization with a peak of a periodic waveform of the reception signal, thereby eliminating a need for a circuit that generates a reset pulse synchronized with the peak of the periodic waveform of the reception signal.

In the embodiment, the liquid discharge device may include a control device that controls the detection circuit. The discharge switch may be switched from off to on based on a discharge command from the control device.

According to the embodiment, the discharge switch can be switched from off to on by the control device transmitting the discharge command. The control device may transmit the discharge command, for example, after liquid level detection is performed or before liquid level detection is performed.

In the embodiment, the liquid discharge device may include a control device that controls the detection circuit. The discharge switch may be switched from on to off based on a detection command from the control device. The detection circuit may perform the detection operation after the discharge switch is switched from on to off.

According to the embodiment, by the control device transmitting the detection command, the discharge switch can be switched from on to off, and then the detection circuit can perform the detection operation.

In the embodiment, the liquid discharge device may include a control device that controls the detection circuit. The detection circuit may output a plurality of detection results by performing the detection operation a plurality of times based on a plurality of detection commands from the control device. The control device may detect the residual quantity of the liquid stored in the storage section based on the plurality of detection results.

According to the embodiment, the residual quantity of the liquid stored in the storage section is detected based on the plurality of detection results, and thus a possibility of erroneous detection can be reduced. For example, the peak detection circuit may hold an erroneous peak value due to noise in a reception signal, and the detection signal output circuit may output a detection signal for erroneous liquid presence and absence determination. According to the embodiment, since the liquid presence and absence determinations are performed a plurality of times for one reception electrode, a possibility of erroneous detection of a liquid level can be reduced by detecting the liquid level based on the determination.

In the embodiment, the discharge switch may be switched from off to on based on a discharge command from the control device after the detection circuit performs the detection operation the plurality of times.

According to the embodiment, even when the peak detection circuit holds the erroneous peak value, the output of the peak detection circuit is reset by switching the discharge switch from off to on after the detection operations. This makes it possible to determine presence or absence of the liquid between the electrodes without being affected by the previous detection result in the detection operations.

In the embodiment, the detection signal output circuit may include a comparison circuit that compares the peak value, which is the output of the peak detection circuit, with a threshold. The detection signal output circuit may output the detection signal based on a comparison result of the comparison circuit.

According to the embodiment, the comparison circuit compares the peak value, which is the output of the peak detection circuit, with the threshold, whereby the presence or absence of the liquid between the electrodes can be detected.

In the embodiment, the peak detection circuit may include an operational amplifier, a diode, and a capacitor. A non-inverting input terminal of the operational amplifier may receive a signal based on the reception signal. An output terminal of the operational amplifier may be coupled to an inverting input terminal. An anode of the diode may be coupled to the output terminal of the operational amplifier. A cathode of the diode may be coupled to one end of the discharge switch. One end of the capacitor may be coupled to the cathode of the diode.

According to the embodiment, the operational amplifier is formed as a voltage follower circuit, and the voltage follower circuit buffers the signal based on the reception signal. When a potential difference between both ends of the diode is in a forward direction, an output voltage of the voltage follower circuit is applied to one end of the capacitor, and thus the capacitor holds a peak value of the output voltage of the voltage follower circuit. Since the peak detection circuit according to the embodiment does not include a sampling circuit, a circuit that generates a sampling pulse synchronized with a peak of a periodic waveform of the reception signal is not necessary.

In the embodiment, the liquid discharge device includes a reception electrode group. The reception electrode group includes the reception electrode described above, and is provided at the second surface. The detection circuit may include a selector circuit that receives a reception signal group from the reception electrode group, and a filter circuit that executes filter processing on a reception signal selected by the selector circuit from the reception signal group and outputs the filtered reception signal to the peak detection circuit.

According to the embodiment, since the selector circuit is provided, it is not necessary to provide a detection circuit for each reception electrode, and a circuit scale can be reduced. The filter circuit executes filter processing on the reception signal selected by the selector circuit, thereby reducing noise in the reception signal. This enables accurate liquid level detection.

In the embodiment, the discharge switch may be switched from on to off when the selector circuit switches the reception signal to be selected.

Whether the liquid is present between the transmission electrode and the reception electrode differs for each reception electrode. According to the embodiment, when the selector circuit switches the reception signal to be selected, the discharge switch is switched from on to off, whereby the peak detection can be performed in a state in which the output of the peak detection circuit is reset. Accordingly, the presence or absence of the liquid between the electrodes is appropriately detected for each reception electrode.

Although the embodiment has been described in detail above, it will be easily understood by those skilled in the art that many modifications can be made without substantially departing from the novel matters and effects according to the present disclosure. Therefore, all such modifications are intended to be included within the scope of the present disclosure. For example, a term described at least once together with a different term having a broader meaning or the same meaning in the description or the drawings can be replaced with the different term in any place in the description or the drawings. All combinations of the embodiment and the modifications are also included in the scope of the present disclosure. Configurations, operations, and the like of the detection circuit, the drive circuit, the circuit device, the control device, the discharge section, the storage section, the liquid discharge device, and the like are not limited to those described in the embodiment, and various modifications can be made.

What is claimed is:

1. A liquid discharge device comprising:
- a discharge section that discharges a liquid;
- a storage section including a first surface and a second surface spaced apart from the first surface in a first direction, and configured to store the liquid between the first surface and the second surface;
- a transmission electrode provided at the first surface;
- a reception electrode provided at the second surface;
- a drive circuit that drives the transmission electrode; and
- a detection circuit that receives a reception signal from the reception electrode, wherein
- the detection circuit includes
  - a peak detection circuit that detects a peak value of the reception signal,
  - a discharge switch provided at an output of the peak detection circuit, and
  - a detection signal output circuit that outputs a detection signal for detecting a residual quantity of the liquid stored in the storage section based on the output of the peak detection circuit, and
- the discharge switch is switched from on to off before a detection operation of the detection circuit.

2. The liquid discharge device according to claim 1, wherein
- the discharge switch is switched from on to off after a liquid discharge operation performed by the discharge section, and
- the detection circuit performs the detection operation after the discharge switch is switched from on to off.

3. The liquid discharge device according to claim 1, wherein
- the liquid discharge device performs a printing operation of discharging the liquid, which is ink, from the discharge section onto a print medium,
- the discharge switch is turned from on to off after the printing operation, and
- the detection circuit performs the detection operation after the discharge switch is turned from on to off.

4. The liquid discharge device according to claim 3, wherein
- the discharge switch is switched from on to off after the printing operation on a predetermined number of sheets.

5. The liquid discharge device according to claim 4, wherein
- the predetermined number of sheets is set according to a print mode of the printing operation.

6. The liquid discharge device according to claim 1, wherein
- the discharge switch is switched from on to off after a nozzle cleaning operation on the discharge section, and
- the detection circuit performs the detection operation after the discharge switch is switched from on to off.

7. The liquid discharge device according to claim 1, wherein
- the discharge switch is switched from on to off after the liquid is injected into the storage section, and
- the detection circuit performs the detection operation after the discharge switch is switched from on to off.

8. The liquid discharge device according to claim 7, wherein
- in an off-carriage system in which the storage section is not mounted on a carriage that scans the discharge section, the discharge switch is switched from on to off after opening of a lid of the storage section is detected or closing of the lid of the storage section is detected.

9. The liquid discharge device according to claim 7, wherein
- in an on-carriage system in which the storage section is mounted on a carriage that scans the discharge section, the discharge switch is switched from on to off when the carriage is disposed at an injection position where the liquid is injected into the storage section.

10. The liquid discharge device according to claim 1, wherein
- the discharge switch is turned off during the detection operation.

11. The liquid discharge device according to claim 1, further comprising:
- a control device that controls the detection circuit, wherein
- the discharge switch is switched from off to on based on a discharge command from the control device.

12. The liquid discharge device according to claim 1, further comprising:
- a control device that controls the detection circuit, wherein
- the discharge switch is switched from on to off based on a detection command from the control device, and
- the detection circuit performs the detection operation after the discharge switch is switched from on to off.

13. The liquid discharge device according to claim 1, further comprising:
- a control device that controls the detection circuit, wherein the detection circuit outputs a plurality of detection results by performing the detection operation a plurality of times based on a plurality of detection commands from the control device, and the control device detects the residual quantity of the liquid stored in the storage section based on the plurality of detection results.

14. The liquid discharge device according to claim 13, wherein the discharge switch is switched from off to on based on a discharge command from the control device after the detection circuit performs the detection operation the plurality of times.

15. The liquid discharge device according to claim 1, wherein the detection signal output circuit includes a comparison circuit that compares the peak value, which is the output of the peak detection circuit, with a threshold, and outputs the detection signal based on a comparison result of the comparison circuit.

16. The liquid discharge device according to claim 1, wherein the peak detection circuit includes an operational amplifier including a non-inverting input terminal that receives a signal based on the reception signal and an output terminal coupled to an inverting input terminal, a diode including an anode coupled to the output terminal of the operational amplifier and a cathode coupled to one end of the discharge switch, and a capacitor including one end coupled to the cathode of the diode.

17. The liquid discharge device according to claim 1, further comprising:

a reception electrode group including the reception electrode and provided at the second surface, wherein the detection circuit includes a selector circuit that receives a reception signal group from the reception electrode group, and a filter circuit that executes filter processing on a reception signal selected by the selector circuit from the reception signal group and outputs the filtered reception signal to the peak detection circuit.

18. The liquid discharge device according to claim 17, wherein the discharge switch is switched from on to off when the selector circuit switches the reception signal to be selected.

* * * * *